Jan. 27, 1970     R. J. KERSTING     3,492,051
CONTROL VALVE
Filed April 25, 1968

INVENTOR
RAYMOND J. KERSTING
BY
*Joseph E. Papin*

United States Patent Office 3,492,051
Patented Jan. 27, 1970

3,492,051
CONTROL VALVE
Raymond J. Kersting, Dellwood, Mo., assignor to Wagner Electric Corporation, Newark, N.J., a corporation of Delaware
Filed Apr. 25, 1968, Ser. No. 729,139
Int. Cl. B60t 8/26
U.S. Cl. 303—6                                   19 Claims

ABSTRACT OF THE DISCLOSURE

A control valve having a resiliently urged member with opposed areas respectively subjected to the separate fluid pressures supplied thereto from a split system master cylinder and movable in response to the separately supplied fluid pressures in excess of a predetermined value acting on said opposed areas to effect a metered proportional application of one of the separately supplied fluid pressures in excess of the predetermined value through said control valve.

---

The present invention relates to control valves and in particular to those for effecting a proportional application of fluid pressure supplied thereto.

In the past, dual fluid pressure system for automotive vehicles were provided with dual or split system type master cylinders which, when actuated, generated separate and substantially equal fluid pressures. One of these separate fluid pressures was applied directly to the front brakes of the vehicle to effect energization thereof, and the other of the separate fluid pressures was applied to the rear brakes through a proportioning valve which was operable to proportionally reduce the magnitude of the other separate fluid pressure effecting energization of the rear brakes with respect to that of the one separate fluid pressures effecting energization of the front brakes. However, a disadvantageous or undesirable feature of such past proportioning valves was that an auxiliary or additional valve was needed in the system to bypass the proportioning valve and obviate the proportioning function thereof in order to insure the delivery of the maximum fluid pressure available to the rear brakes in the event of the failure of the fluid pressure delivered to the front brakes.

The principal object of the present invention is to provide a proportioning valve which overcomes the aforementioned disadvantageous features, and this, as well as other objects and advantageous features of the present invention will become apparent hereinafter.

Briefly, the present invention comprises a control valve, resiliently urged by means movable in said control valve in response to separate fluid pressures supplied thereto to effect a proportional application through said control valve of one of the separately supplied fluid pressures.

In the drawings wherein like numerals refer to like parts wherever they occur:

Figures 1, 2, 3:
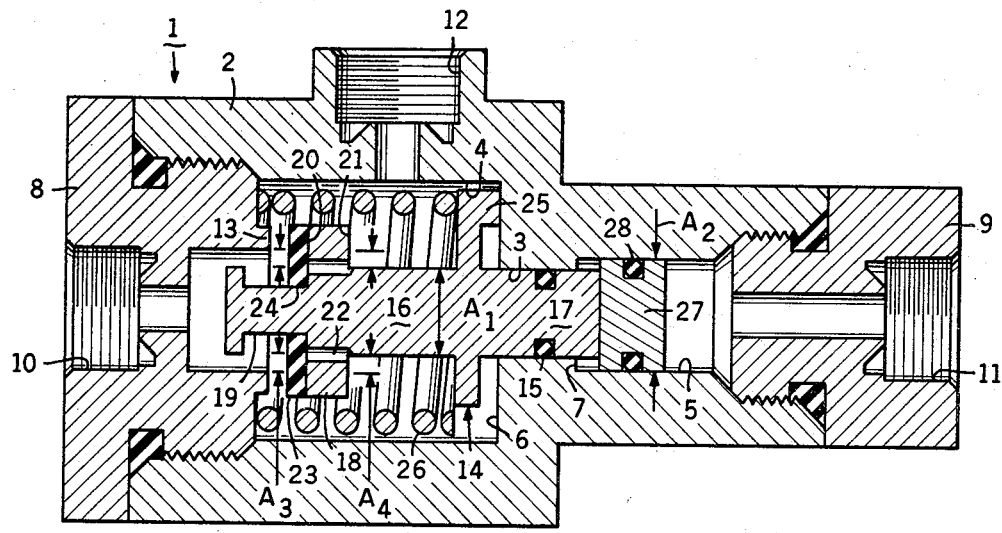
FIG. 1 is a sectional view showing a control valve embodying the present invention in cross-section.
FIG. 2 is a fragmentary view of the control valve of FIG. 1 showing an alternate construction in cross-section also embodying the present invention.
FIG. 3 is a graphical representation illustrating the output fluid pressure effected by the control valve of FIG. 1 in response to the separate input pressures supplied thereto.

Referring now to FIG. 1 in detail, a control or proportioning valve 1 is provided with a housing 2 having a bore 3 therein interposed between opposed counterbores 4, 5, and opposed shoulders 6, 7 are provided on said housing at the juncture of said bore and opposed counterbores, respectively. Closure members or end plugs 8, 9 are threadedly received in the open end of the counterbores 4, 5 defining opposed end walls thereof, and inlet ports 10, 11 are provided through said end plugs connecting with the counterbores 4, 5, respectively. The inlet port 10 is adapted for connection with one of the separate fluid pressure generating chambers of the usual split system type master cylinder (not shown) which is well known to the art, and the inlet port 11 is adapted for connection in pressure fluid communication with the other fluid pressure generating chamber of said split system master cylinder and also the vehicle front brakes (not shown). An outlet port 12, which is adapted for connection in pressure fluid communication with the vehicle rear brakes (not shown), is provided in the housing 2 intersecting with the counterbore 4 between the housing shoulder 6 and the end plug 8, and a valve seat 13 is provided on said end plug between said outlet port and the inlet port 10 in circumscribing relation with said inlet port.

A resiliently urged proportioning or metering member, such as the piston indicated generally at 14, is slidably received in the housing bore 3 and provided with a peripheral seal 15 in sealing engagement with said housing bore. The piston 14 is provided with opposed leftward and rightward portions or extensions 16, 17 which extend coaxially into the counterbores 4, 5, and the leftward piston portion 16 is provided with a radially extending or annual flange 18 integrally formed thereon adjacent to the valve seat 13 and a reduced end portion 19. The flange 18 is provided with opposed annular faces or sides 20, 21, and a plurality of passages 22 are axially provided through said flange between said faces. A valve member or element 23 for engagement with the end plug valve seat 13 is provided with a central aperture 24 slidably received on the leftward piston portion reduced end 19, and said valve member is normally engaged with the leftward face 20 of the flange 18 closing the passages 22. The leftward piston portion 16 is also provided with a radially extending retainer or abutment 25, and a metering or proportioning spring 26 is interposed between the closure member 8 and said abutment normally urging said abutment into engagement with the housing shoulder 6. When the abutment 25 is so engaged with the housing shoulder 6, the piston 14 is in its normal position with the valve member 23 disengaged from the valve seat 13 to provide open pressure fluid communication between inlet and outlet ports 10, 12.

Another piston 27 having a peripheral seal 28 therein is slidably received in the housing counterbore 5 between the housing shoulder 7 and the end plug 9 in abutting engagement with the free end of the rightward piston portion 17. Although the piston 27 is shown separate from the piston 14, it is obvious that for all practical purposes said pistons 14, 27 can be considered as an integral element. For instance, in the alternate construction shown in FIG. 2, a reduced end 29 is shown integrally formed on the rightward piston portion 17 having a peripheral seal 30 therein, and a bore 31 is provided in the piston 27 and received on said reduced end in sealing engagement with said peripheral seal. The piston 27 is retained against displacement from the reduced end 29 for concerted movement with the piston 14 by suitable means, such as the screw 32.

Referring now again to FIG. 1, it should be noted that the piston 14 is provided with an effective area $A_1$ generally defined by the sealing engagement of the seal 15 with the housing bore 3 and subjected to the fluid pressure at the inlet port 10, and the piston 27 is provided with an effective area $A_2$ generally defined by the sealing engagement of the seal 28 with the counterbore 5 and subjected to the fluid pressure at the inlet port 11, said area $A_2$ being predeterminately greater than the area $A_1$ and opposed thereto. A pair of opposed substantially equal effective areas $A_3$, $A_4$ are provided on the valve element 23 and the flange 18 for respective subjection to the fluid pressure at the inlet port 10 and the established fluid pressure at the outlet port 12 when said valve member is engaged with the valve seat 13, as will be discussed hereinafter. To complete the description of the control valve 1, the areas $A_3$, $A_4$ are generally defined as being equal to the difference between the cross-sectional area of the seating engagement of the valve member 23 with the valve seat 13 and the area $A_1$, and it should also be noted that the sum of the additive areas $A_1$ and $A_3$ is greater than the opposing area $A_2$.

In the operation with the component parts of the control valve 1 in their inoperative or normal positions, as shown, separate and substantially equal input or supplied fluid pressures $P_1$, $P_2$ are supplied by the split system master cylinder (not shown) to the inlet ports 10, 11, respectively. The fluid pressure $P_1$ flows from the inlet port 10 through the counterbore 4 to establish an output fluid pressure $P_3$ at the outlet port 12, said input fluid pressure $P_1$ acting on the effective area $A_1$ of the piston 14 to establish an input force $P_1A_1$ urging the piston abutment 25 toward engagement with the housing shoulder 6, and the input fluid pressure $P_2$ flows from the inlet port 11 into the counterbore 5 acting on the area $A_2$ of the piston 27 to establish another input force $P_2A_2$ opposite to the force $P_1A_1$. When the input fluid pressures $P_1$, $P_2$ and the output fluid pressure $P_3$ attain a predetermined value R, as shown on the line OT in the graph of FIG. 3, the input force $P_2A_2$ overcomes the input force $P_1A_1$ and the additive compressive force Fs of the metering spring 26 to concertedly move the pistons 14, 27 leftwardly toward their interrupting or proportioning position engaging the valve element 23 with the end plug valve seat 13 to interrupt pressure fluid communication between the inlet and outlet ports 10, 12. When the valve element 23 is engaged with the seat 13, the area $A_3$ is acted upon by the input fluid pressure $P_1$ to establish another input force $P_1A_3$ which is additive to the input force $P_1A_1$ and the spring force Fs; however, the output fluid pressure $P_3$ acts on the area $A_4$ which is opposed and substantially equal to the area $A_3$ to establish an output force $P_3A_4$ which balances the force $P_1A_3$. In view of the foregoing, it is apparent that the additive input and output forces $P_2A_2$ and $P_3A_4$ will maintain the valve 23 in engagement with the seat 13 against the additive input and spring forces $P_1(A_1+A_3)$ and Fs when the magnitude of the input fluid pressures $P_1$, $P_2$ and the output fluid pressure $P_3$ are at the predetermined value R.

When the input fluid pressures $P_1$, $P_2$ are increased along the line OT of the graph in FIG. 3 to a valve in excess of the predetermined value R, the input forces $P_1(A_1+A_3)$ and $P_2A_2$ are correspondingly increased, and the increased input force $P_1(A_1+A_3)$ assisted by the spring force Fs urges the pistons 14, 27 rightwardly toward their metering position against the opposing increased input force $P_2A_2$ and the output force $P_3A_4$. This concerted rightward movement of the pistons 14, 27 disengages the valve element 23 from the end plug valve seat 13 to establish metered pressure fluid communication between the inlet and outlet ports 10, 12 and effect a proportional increase in the output fluid pressure $P_3$ along the line RU in the graph of FIG. 3 in the following ratio:

$$P_3 = \frac{P_1(A_1+A_3)+Fs-P_2A_2}{A_4}$$

The proportional increase in the output fluid pressure $P_3$ effects a corresponding increase in the output force $P_3A_4$, and when the additive increased input and output forces $P_2A_2$ and $P_3A_4$ attain a value substantially equal to that of the opposing increased input force $P_1(A_1+A_3)$ and the additive spring force Fs, the pistons 14, 27 are again concertedly moved leftwardly to their interrupting position to reengage the valve element 23 with the end plug seat 13 and again interrupt pressure fluid communication between the inlet and outlet ports 10, 12. If the input fluid pressures $P_1$, $P_2$ are further increased, the component parts of the control valve 1 function in the same manner as described hereinbefore to effect further proportional increases in the output fluid pressure $P_3$.

When the desired braking effort is attained, the split system master cylinder is de-actuated to eliminate the input fluid pressures $P_1$, $P_2$, and when the input fluid pressures $P_1$, $P_2$ are so decreased along the line OT in the graph of FIG. 3 below the value of the output fluid pressure on the line RU of said graph, a fluid pressure differential is established across the valve element 23 acting to displace the radially inward portion of said valve element from engagement with the leftward face 20 of the piston flange 18 thereby permitting the return flow of the displaced output fluid pressure $P_3$ through the flange passages 22 and the central aperture 24 of said valve element to the inlet port 10. This return flow of the displaced output fluid pressure $P_3$ is illustrated in the graph of FIG. 3 along the line USR. When the input fluid pressures $P_1$, $P_2$ and the output fluid pressure $P_3$ are so reduced to a value less than the predetermined value R, the input force $P_1(A_1+A_3)$ assisted by the spring force Fs overcomes the opposing input and output forces $P_1A_2$ and $P_3A_4$ to concertedly move the pistons 14, 27 from their interrupting position to their original position with the piston abutment 25 engaged with the shoulder 6 and the valve element 23 disengaged from the end plug seat 13 re-establishing open pressure fluid communication between the inlet and outlet ports 10, 12.

As mentioned hereinbefore, it is desirable to obviate the proportioning function of the control valve 1 in order to insure the delivery of the maximum input fluid pressure $P_1$ to the outlet port 12 which is applied to the vehicle rear brakes (not shown) under emergency vehicle operating conditions in the event of the failure of the input fluid pressure $P_2$ which is applied to the vehicle front brakes (not shown). When the pistons 14, 27 are in their proportioning or interrupting positions, the input fluid pressures $P_1$, $P_2$ and the output fluid pressure $P_3$ have magnitudes equal to or in excess of the predetermined value R; therefore, in the event of the failure of the input fluid pressure $P_2$, the input force $P_2A_2$ is eliminated. Upon such elimination of the input force $P_2A_2$, the output force $P_3A_4$ is, of course, overcome by the additive input force $P_1(A_1 + A_3)$ and spring force Fs to immediately move the pistons 14, 27 from their proportioning or interrupting position to their original position disengaging the valve element 23 from the valve seat 13 to effect open pressure fluid communication between the inlet and outlet ports 10, 12 and obviate the proportioning function of said pistons under such emergency vehicle operating conditions. In this manner, when the proportioning function of the control valve 1 is obviated, unimpeded or nonproportioned flow of the maximum available input fluid pressure $P_1$ at the inlet port 10 is effected through the counterbore 4 to the outlet port 12 past the disabled or by-passed valve element 23 which is maintained open in response to the additive input and spring forces $P_1A_1$ and Fs urging the pistons 14, 27 toward their original or inoperative position.

From the foregoing, it is now apparent that a novel control valve 1 meeting the objects set out hereinbefore, as well as other objects and advantageous features, is provided and that changes or modifications as to the precise configurations, shapes and details of the construction set forth in the disclosure by way of illustration may be made by those skilled in the art without departing from the spirit of the invention.

The embodiments of the invention in which an exclusive property or privilege is claimed are defined as follows:

1. A proportioning valve comprising a housing resiliently urged means having opposed portion thereon subjected to separate fluid pressures supplied to said housing and movable in said housing to control the application therethrough of one of the supplied fluid pressures, opposed differential areas on said opposed portions subjected to the supplied fluid pressures, respectively, said resiliently urged means being initially movable against its own force toward a position isolating the one supplied fluid pressure from the applied fluid pressure when the supplied fluid pressures acting on said differential areas attain a predetermined value, and another pair of opposed areas on said resiliently urged means for respective subjection to the one supplied fluid pressure and the applied fluid pressure and respectively additive to said differential areas upon the movement of said resiliently urged means to its isolating position, said resiliently urged means also being thereafter further movable in response to the additive forces of the one supplied fluid pressure in excess of the predetermined value acting on one of said differential areas and one of said other areas and assisted by its own force against the additive forces of the other supplied fluid pressure and the applied fluid pressure respectively acting on the other of said differential areas and the other of said other areas toward a metering position to effect a metered increase in the applied fluid pressure proportional to the increased one supplied fluid pressure in excess of the predetermined value.

2. The proportioning valve according to claim 1, comprising passage means in said resiliently urged means for the return flow of applied fluid pressure, and valve means movable in said passage means to establish only return flow of applied fluid pressure therethrough when the one supplied fluid pressure is reduced to a magnitude less than that of the applied fluid pressure but in excess of the predetermined value.

3. The proportioning valve according to claim 1, comprising abutment means on said housing for engagement with said resiliently urged means and defining the inoperative position thereof, said resiliently urged means being movable in response to its own force and the additive force of the one supplied fluid pressure acting on said one differential area into engagement with said abutment means in the event of the failure of the other supplied fluid pressure to obviate the metering function of said resiliently urged means and effect an unmetered application through said housing of the one supplied fluid pressure.

4. The proportioning valve according to claim 1, wherein said other differential area is greater than said one differential area and the sum of said one differential area and said one of said other areas is greater than said other differential area.

5. The proportioning valve according to claim 1, wherein one of said opposed portions defines with said housing a pressure fluid flow passage for the application therethrough of the one supplied fluid pressure, said one differential area and said other areas being on said one opposed portion, and the other of said opposed portions defines with said housing a chamber for subjection to the other of the supplied fluid pressures, said other differential area being on said other opposed portion.

6. The proportioning valve according to claim 5, comprising a valve seat on said housing about said flow passage, valve means on said one opposed portion for engagement with said valve seat, said resiliently urged means being movable against its own force toward its isolating position to engage said valve means with said valve seat when the one and other supplied fluid pressures acting on said one and other differential areas attain the predetermined value, said valve means being disengaged from said valve seat to effect the metered increase in the applied fluid pressure upon movement of said resiliently urged means toward its metered position.

7. The proportioning valve according to claim 6, wherein said other differential area is greater than said one differential area and said other areas are respectively substantially equal to the difference between said one and other differential areas.

8. The proportioning valve according to claim 5, wherein said resiliently urged means includes piston means slidable in said housing, said one and other opposed portions being defined on said piston means, abutment means on said piston for engagement with said housing to define the normal position of said piston means, and spring means engaged with said piston means and urging said abutment means toward engagement with said housing, the application of the one supplied fluid pressure less than the predetermined value through said flow passage being unrestricted when said piston means is in its normal position.

9. The proportioning valve according to claim 8, comprising a valve seat on said housing about said flow passage, flange means on said piston means, valve means on said flange means for engagement with said valve seat, said piston means being movable from its normal position toward its isolating position against said spring means to engage said valve means with said valve seat isolating the one supplied fluid pressure from the applied fluid pressure when the one and other supplied fluid pressures respectively acting on said one and other differential areas attain the predetermined value, and said valve means being disengaged from said valve seat to effect the metered increase in the applied fluid pressure upon movement of said piston means from its isolating position against the additive forces of the other supplied fluid pressure in excess of the predetermined value acting on said other differential area and the applied fluid pressure acting on said other of said other areas toward its metering position in response to the additive forces of the one supplied fluid pressure in excess of the predetermined value acting on said one differential area and said one of said other areas and assisted by said spring means.

10. The proportioning valve according to claim 9, comprising passage means extending through said flange means for connection between the one supplied fluid pressure and the applied fluid pressure only when said valve means is engaged with said valve seat, said valve means having a portion controlling said passage means and permitting only the return flow of applied fluid pressure therethrough, said valve means portion being movable to a position opening said passage means to establish the return flow of the applied fluid pressure when the one supplied fluid pressure is reduced to a magnitude less than that of the applied fluid pressure but not less than the predetermined value.

11. A proportioning valve comprising a housing having a pair of inlet ports and an outlet port therein, said inlet ports being selectively subjected to separate and normally substantially equal fluid pressures, means movable in said housing for controlling pressure fluid communication between one of said inlet ports and said outlet port, resilient means normally urging said first named means toward a position in said housing establishing open communication between said one inlet port and said outlet port, opposed differential areas on said first named means respectively subjected to the fluid pressures at said inlet ports, said first named means being initially movable against said resilient means toward a position interrupting communication between the fluid pressure at said one inlet port and the established fluid pressure at said outlet port when the fluid pressures at said one inlet port and the other of said inlet ports respectively acting on said one of said differential areas and the other of said differential areas attain a predetermined value, and opposed third and fourth areas on said first named means for subjection to the fluid pressure at said one inlet port and the established fluid pressure at said outlet port and additive to said one and other differential areas, respectively, when said first named means is in its interrupting position, said first named means being movable from its interrupting position in response to an increase in the fluid pressure in excess of the predetermined value at said one inlet port acting on said one differential area and said third area and assisted by the force of said resilient means against the increased fluid pressure in excess of the predetermined value at said other inlet port acting on said other differential area and the established fluid pressure at said outlet port acting on said fourth area toward a position establishing metered communication between said one inlet port and said outlet port to increase the established fluid pressure at said outlet port in a predetermined ratio with the increased fluid pressure at said one inlet port in excess of the predetermined value.

12. The proportioning valve according to claim 11, comprising passage means in said first named means for connection in pressure fluid communication between said one inlet port and said outlet port when said first named means is in its interrupting position, and valve means controlling said passage means to permit only the flow therethrough of the established fluid pressure at said outlet port to said one inlet port when the fluid pressure at said one inlet port is reduced to a magnitude less than that of the established fluid pressure at said outlet port but not less than the predetermined value.

13. The proportioning valve according to claim 11, comprising abutment means on said housing for engagement with said first named means and defining the first named position thereof, said first named means being movable in response to the force of said resilient means and the fluid pressure at said one inlet port acting on said one opposed and third areas and against the established fluid pressure at said outlet port acting on said fourth area into engagement with said abutment means in the event of the failure of the fluid pressure at said other inlet port to establish open pressure fluid communication between said one inlet port and said outlet port.

14. The proportioning valve according to claim 11, wherein said one differential area is less than said other differential area, and the sum of said one differential area and said third area is greater than said other differential area.

15. The proportioning valve according to claim 14, comprising a valve seat on said housing between said one inlet port and said outlet port, and valve means on said first named means for engagement with said valve seat, said valve means engaged with said valve seat upon the movement of said first named means from its first named position to its interrupting position and said valve means being disengaged from said valve seat upon movement of said first named means from its interrupting position to its metering position.

16. The proportioning valve according to claim 15, wherein said first named means comprises piston means movable in said housing between said one and other inlet ports, one and other opposed end portions on said piston means respectively defining said one and other differential areas, flange means on said one opposed end portion defining said third and fourth areas, said valve means being on said flange means, and abutment means on said piston means for engagement with a portion of said housing when said piston means is in its first named position.

17. The proportioning valve according to claim 16, comprising a passage extending through said flange means for connection between said one inlet port and said outlet port only when said valve means is engaged with said valve seat, said valve means having a portion normally closing said passage and movable to permit only the passage therethrough of the established fluid pressure from said outlet port to said one inlet port when the fluid pressure at said one inlet port acting on said valve means portion is reduced to a magnitude less than that of the established fluid pressure at said outlet port acting on said valve means portion in opposition to the fluid pressure at said one inlet port.

18. The proportioning valve according to claim 16, wherein said resilient means includes a spring engaged between said piston means and housing and urging said abutment means toward engagement with said housing portion in the event of the failure of the fluid pressure at said other inlet port.

19. The proportioning valve according to claim 16, comprising a bore in said housing interposed between a pair of counterbores, a shoulder on said housing between said bore and one of said counterbores defining said housing portion, said housing including a pair of closure members defining opposed end walls for said counterbores, respectively, said valve seat being defined on one of said end walls in said one counterbore and spaced from said shoulder, said one inlet port being provided in said one end wall and extending through said valve seat, said outlet port intersecting with said one counterbore between said one end wall and said shoulder, said other inlet port extending through the other of said end walls and connecting with the other of said counterbores, said piston means being slidable in said bore having said other end portion slidable in said other counterbore and said one end portion thereof extending coaxially into said one counterbore, and opposed ends on said spring respectively engaged between said one end wall and piston means urging said abutment means toward engagement with said shoulder.

References Cited

UNITED STATES PATENTS

| 3,169,800 | 2/1965 | Oberthur | 303—22 |
| 3,403,944 | 10/1968 | Thirion | 303—22 X |
| 3,410,090 | 11/1968 | Thirion | 303—6 X |
| 3,410,612 | 11/1968 | Lepelletier | 303—6 X |

MILTON BUCHLER, Primary Examiner

J. J. McLAUGHLIN, JR., Assistant Examiner

U.S. Cl. X.R.

60—54.5; 137—100; 188—152; 303—84